United States Patent [19]

Hemmingsen et al.

[11] Patent Number: 4,941,056
[45] Date of Patent: Jul. 10, 1990

[54] A METHOD FOR OBTAINING DATA FROM AN ORIGINAL DOCUMENT USING A CAMERA SUPPORTED OR AN AIR CUSHION

[75] Inventors: Hans Hemmingsen, Birkerod; Lars S. Christensen, Helsinge; Kristian B. Monnike, Allerod, all of Denmark

[73] Assignee: Eskofot A/S, Ballerup, Denmark

[21] Appl. No.: 273,985

[22] Filed: Nov. 21, 1988

[30] Foreign Application Priority Data

Nov. 24, 1987 [DK] Denmark .............................. 6177/87

[51] Int. Cl.$^5$ ................................................ H04N 1/10
[52] U.S. Cl. ..................................... 358/497; 358/494
[58] Field of Search ........................ 358/474, 494, 497

[56] References Cited

U.S. PATENT DOCUMENTS

| 4,486,786 | 12/1984 | Sato et al. | 358/497 |
| 4,764,815 | 8/1988 | Landsman | 358/497 |
| 4,792,858 | 12/1988 | Landsman | 358/497 |

FOREIGN PATENT DOCUMENTS

| 3516924 | 11/1986 | Fed. Rep. of Germany . |
| 2168216 | 6/1986 | United Kingdom ................ 358/497 |

Primary Examiner—James J. Groody
Assistant Examiner—Randall S. Svihla
Attorney, Agent, or Firm—Cushman, Darby & Cushman

[57] ABSTRACT

A method for obtaining digital data from an original, whereby the original is scanned in longitudinally successive, transversally extending strips by a semiconductor camera comprising a plurality of semiconductor elements arranged in series. The semiconductor camera is guided across the original or across a glass plate covering the original, in a transversely arranged, longitudinally displaceable portal-shaped supporting device. Distance between the original and the camera is maintained by moving the camera directly across the original or the glass plate covering the original, respectively. This method allows an exact adjustment of the distance between the camera and the original, although the intermediate glass plate may not be quite planar. In order to avoid scratching the surface of the glass plate, the distance between the camera and the original or the glass plate covering the original is maintained by means of an air-delivering unit, thus enabling an adjustment of the distance without the camera contacting the original or the glass plate, respectively.

8 Claims, 3 Drawing Sheets

A METHOD FOR OBTAINING DATA FROM AN ORIGINAL DOCUMENT USING A CAMERA SUPPORTED OR AN AIR CUSHION

BACKGROUND OF THE INVENTION

The present invention relates to a method for obtaining digital data from an original object, e.g. a document (hereinafter sometimes denoted an "original") in which method the original is scanned in longitudinally successive, transversally extending sections by means of a semiconductor camera comprising a plurality of semiconductor elements arranged in series. The semiconductor camera is guided across the original, or across a glass plate covering the original, in a transversely arranged, longitudinally displaceable portal-shaped device.

SUMMARY OF THE INVENTION

According to the invention the distance between the original or the glass plate covering the original and the camera is maintained by the camera being moved directly across the original or the glass plate, respectively. This allows an exact adjustment of the distance between the camera and the original to be made, although in the latter instance, the intermediate glass plate is not quite planar. In order to avoid scratching the surface of the glass plate, the distance between the camera and the original or the glass plate covering the original is maintained by means of an air-delivering unit. This allows an adjustment of the distance from the camera to the upper surface of the original or the glass plate (whichever is uppermost), to be made without the semiconductor camera physically contacting the original or the glass plate, respectively.

The air-delivering unit is advantageously an air cushion unit in form of an annular body with openings along its rim. The annular body is preferably suspended on gimbals.

The semiconductor camera is suspended by two plates arranged in form of a parallelogram, thus avoiding fogging of the sides during the displacement of the portal-shaped means.

The air-delivering unit for maintaining a predetermined distance between the camera and the surface to be scanned can also comprise a manometer communicating with a servomechanism for controlling the air supply depending on the measured pressure.

BRIEF DESCRIPTION OF THE DRAWINGS

The invention is described in greater detail below and with reference to the accompanying drawings, in which.

DESCRIPTION OF THE PREFERRED EMBODIMENT

Figure 1:
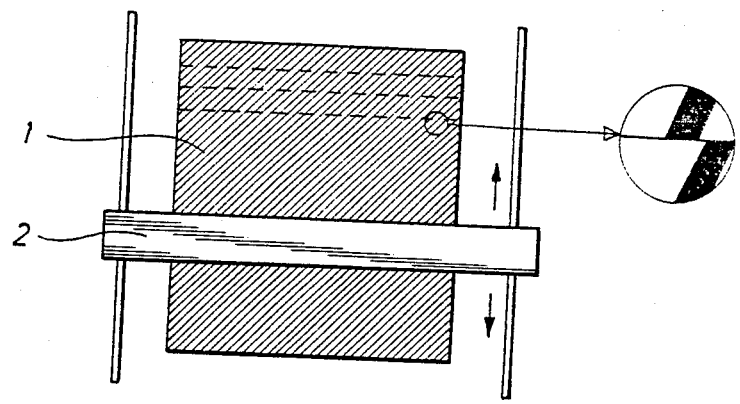
FIG. 1 is a top view of a movable scanner.
Figure 2:
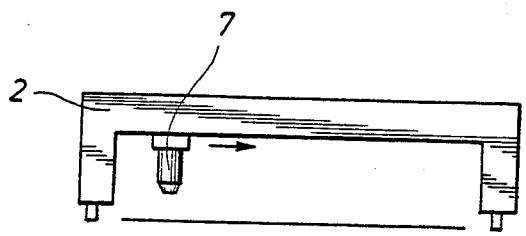
FIG. 2 is a side view of the scanner of FIG. 1.

The scanner of FIGS. 1 and 2 obtains digital data by scanning an original 1 in longitudinally successive, transversally extending strips by means of a semiconductor camera in form of a CCD (charged coupled device) array comprising a number of semiconductor elements arranged in series. The semiconductor camera comprises 1,024 semiconductors in one series. The series of semiconductor elements examines a longitudinally extending patch of a transversally extending strip of the original 1 and is moved transversally of the original to accomplish a scan of the strip. Thereafter, the camera is moved longitudinally of the original to the next strip, and the next strip is similarly scanned. This procedure is repeated until all strips of the original have been similarly scanned. The advantage of this type of scanning is an improved resolution without requiring use of a sufficient number of semiconductors as to simultaneously sense the entire width and/or length of the original. The data obtained from the original is processed to be used for reproduction purposes.

Figure 3:
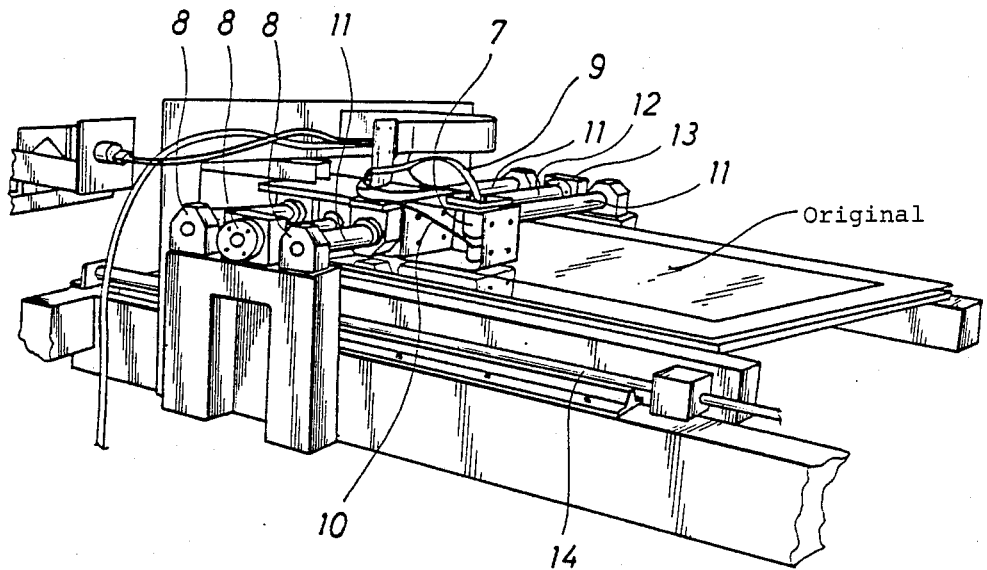
FIG. 3 is a perspective view of the scanner of FIG. 1.

The suspension means can be moved along a transverse portal-shaped means 2, cf. FIGS. 2 and 3. The portal-shaped means comprises a carriage displaceable along the firmly fixed guideways 11. The portal-shaped means 2 is displaced by means of a rotatable threaded shaft 12, the threading on the threaded shaft being in engagement with distorted nuts in the carriage. One end of the rotatable shaft 12 is controlled by a step motor 13, while the other end is provided with a means (not shown) for measuring the displacement of the carriage. The portal-shaped means 2 is longitudinally displaceable, cf. FIG. 1, where the portal-shaped means 2 is moved in guideways 14. The longitudinal movement is also effected by means of a rotatable threaded shaft (not shown), the threading on the threaded shaft engaging distorted nuts (not shown) connected with the portal-shaped means 2. Since not the slightest fogging may occur, the distorted nuts are employed, for instance nuts of the type sold by Steinmeyer. The problem is, however, that the glass plate 12 covering the original is not planar. It is impossible to manufacture a completely planar glass plate. Its thickness is, on the other hand, relatively uniform. It was thus conceived to let the camera 7 "float" over the glass plate on an air cushion. As a result the desired distance between the camera 7 and the glass plate 12 can be maintained. The air cushion unit is suspended on gimbals so that the floating height is easily adapted to existing unevennesses, cf. FIG. 4. Moreover, the unit is suspended by two parallel plates 4 ensuring the parallelity of said unit (parallelogram suspension) and avoiding fogging of the sides. The floating height is approx. 0.06 mm. Dry, clean air is blown onto the surface to be scanned. It is not necessary to cover an original with a glass plate. The original can be scanned directly. The important feature in both cases is the adjustment of the distance without the camera contacting the original or the glass plate, respectively.

Figure 5:
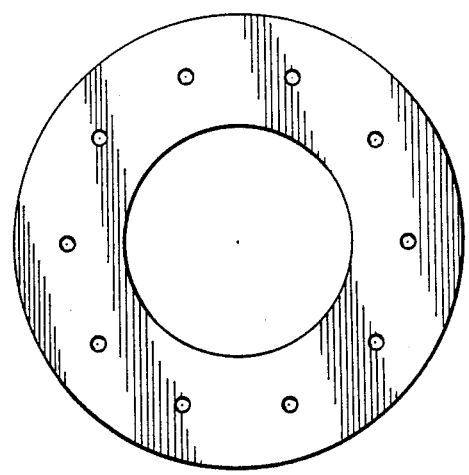
FIG. 5 is a bottom view of the air cushion unit.

The air-cushion unit has the shape of an annulus 5 with openings 6 along its rim, cf. FIG. 5. Moreover, light is supplied from above to the area to be scanned by the camera 7 via one or more optical fibers. Optionally, light can also be supplied from below. The signals from the suspended CCD camera 7 are transmitted to an amplifier and an A/D converter, and the converted signal is passed therefrom from there to processors.

FIG. 3 is a perspective view of the scanning device, showing the portal-shaped means 2, which is longitudinally displaceable as indicated in FIG. 1. The entire suspension means for the CCD camera 7 is transversally displaceable along the portal-shaped means 2, as indicated in FIG. 2, and is kept in place by firmly fixed guideways 8. FIG. 3 also shows tubes 9 for the supply of pressurized air to the air cushion unit 5, 6, and optical fibers 10 for illuminating the area to be scanned by the CCD camera 7.

Figure 4:
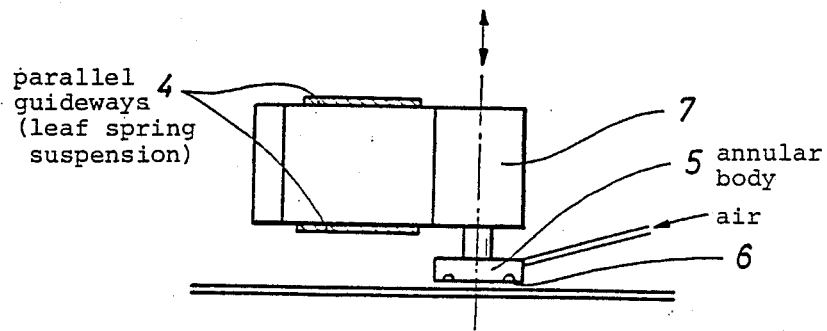
FIG. 4 illustrates the suspension of the semiconductor camera.

FIG. 4 is a perspective view of the suspension arrangement, showing a leaf spring suspension forming parallel guideways.

In an another embodiment a manometer is employed for adjusting the air supply depending on the measured pressure.

The desired distance between the camera and the original can also be maintained by the camera being moved across the original or the covering glass plate directly or by means of mechanical guideways.

The resolution obtained by the inventive method is approx. 10 μm.

What is claimed is:

1. A method for obtaining digital data from an original, comprising:
   (a) providing an original supported on a bed so as to have a substantially horizontal, upwardly presenting surface from which data may be read;
   (b) providing a semiconductor camera comprising a plurality of semiconductor elements arranged in a series which is less broad and less long than said original;
   (c) providing a portal device movably supported on said bed for movement longitudinally of the original, the portal device being comparable in breadth to the original;
   (d) mounting the camera to the portal device for movement transversally of the portal device and for vertical movement relative to the portal device towards and away from the original;
   (e) while supporting said camera on a cushion of pressurized air issuing from adjacent the camera towards said surface, so that the camera floats above said surface by an amount which is dependent upon the pressure of said pressurized air in said cushion, moving said camera transversally of said original along said portal device while operating said camera to examine a respective strip of said original, and thereby acquire data therefrom; and
   (f) moving said portal device longitudinally of the document to vertical juxtaposition with a respective longitudinally successive strip of said original and repeating step (e).

2. The method of claim 1, wherein:
while conducting step (e), said pressurized air issues from a plurality of downwardly directed openings arranged in a circle around said camera.

3. The method of claim 2, wherein:
said openings are provided in an annular body suspended on gimbals relative to said portal device.

4. The method of claim 2, wherein:
said camera is suspended on leaf springs relative to said portal device for permitting vertical movement of the camera relative to the portal device.

5. The method of claim 2, wherein:
said camera is suspended on a parallelogram linkage relative to said portal device for permitting vertical movement of the camera relative to the portal device.

6. The method of claim 2, wherein:
a manometer is provided as an input device in a feedback control loop with a servo-control mechanism, with the manometer measuring air pressure in said cushion of pressurized air as step (e) is being conducted, for regulating the height of the camera above the original.

7. The method of claim 2, wherein:
said surface is provided directly on said original.

8. The method of claim 2, wherein:
said surface is provided on a plate of transparent material covering said original.

* * * * *